(12) United States Patent
Hamada

(10) Patent No.: US 12,706,248 B2
(45) Date of Patent: Aug. 11, 2026

(54) MULTILAYER CERAMIC ELECTRONIC COMPONENT AND METHOD FOR PRODUCING MULTILAYER CERAMIC ELECTRONIC COMPONENT

(71) Applicant: Murata Manufacturing Co., Ltd., Nagaokakyo (JP)

(72) Inventor: Daisuke Hamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 80 days.

(21) Appl. No.: 18/404,937

(22) Filed: Jan. 5, 2024

(65) Prior Publication Data

US 2024/0145168 A1 May 2, 2024

Related U.S. Application Data

(63) Continuation of application No. PCT/JP2022/028001, filed on Jul. 19, 2022.

(30) Foreign Application Priority Data

Jul. 30, 2021 (JP) ................................ 2021-125895

(51) Int. Cl.

| | |
|---|---|
| ***H01G 4/012*** | (2006.01) |
| ***H01G 4/12*** | (2006.01) |
| ***H01G 4/232*** | (2006.01) |
| ***H01G 4/30*** | (2006.01) |

(52) U.S. Cl.

CPC ........... *H01G 4/012* (2013.01); *H01G 4/2325* (2013.01); *H01G 4/30* (2013.01); *H01G 4/1209* (2013.01)

(58) Field of Classification Search

CPC ........ H01G 4/012; H01G 4/2325; H01G 4/30; H01G 4/1209

See application file for complete search history.

(56) References Cited

U.S. PATENT DOCUMENTS

| | | | | |
|---|---|---|---|---|
| 2015/0155100 A1* | 6/2015 | Morita | H01G 4/012 | 361/301.4 |
| 2016/0093438 A1* | 3/2016 | Sasabayashi | H01G 4/12 | 361/301.4 |
| 2018/0090276 A1* | 3/2018 | Ito | H01G 4/248 | |
| 2019/0304683 A1* | 10/2019 | Terashita | H01G 4/228 | |
| 2019/0355522 A1* | 11/2019 | Kanbe | H01G 4/232 | |

(Continued)

FOREIGN PATENT DOCUMENTS

| | | |
|---|---|---|
| CN | 112242255 A | 1/2021 |
| JP | 2004084055 A | 3/2004 |
| JP | 2006131928 A | 5/2006 |

(Continued)

OTHER PUBLICATIONS

International Search Report in PCT/JP2022/028001, mailed Oct. 11, 2022, 3 pages.

(Continued)

*Primary Examiner* — Michael P McFadden
(74) *Attorney, Agent, or Firm* — Keating & Bennett, LLP

(57) ABSTRACT

A multilayer ceramic electronic component includes a multilayer body including a plurality of insulator layers including ceramic, and a plurality of inner electrode layers. An aspect ratio of a metal particle of the inner electrode layers is about 1.8 or greater.

20 Claims, 12 Drawing Sheets

(56) References Cited

U.S. PATENT DOCUMENTS

| | | | | |
|---|---|---|---|---|
| 2021/0020380 | A1* | 1/2021 | Sasabayashi | H01G 4/012 |
| 2021/0183572 | A1* | 6/2021 | Kim | H01G 4/1227 |

FOREIGN PATENT DOCUMENTS

| | | | |
|---|---|---|---|
| JP | 2010059467 | A | 3/2010 |
| JP | 2011091083 | A | 5/2011 |
| JP | 2013232627 | A | 11/2013 |
| JP | 2021019101 | A | 2/2021 |

OTHER PUBLICATIONS

Written Opinion in PCT/JP2022/028001, mailed Oct. 11, 2022, 3 pages.

Hamada, “Multilayer Ceramic Electronic Component and Method for Producing Multilayer Ceramic Electronic Component”, U.S. Appl. No. 19/654,869, filed Apr. 22, 2026.

Official Communication issued in corresponding Chinese Patent Application No. 202280046415.5, mailed on Jun. 22, 2026, 6 pages.

* cited by examiner

WT SECTIONAL VIEW

LT SECTIONAL VIEW

MULTILAYER CERAMIC ELECTRONIC COMPONENT AND METHOD FOR PRODUCING MULTILAYER CERAMIC ELECTRONIC COMPONENT

CROSS REFERENCE TO RELATED APPLICATIONS

This application claims the benefit of priority to Japanese Patent Application No. 2021-125895 filed on Jul. 30, 2021 and is a Continuation Application of PCT Application No. PCT/JP2022/028001 filed on Jul. 19, 2022. The entire contents of each application are hereby incorporated herein by reference.

BACKGROUND OF THE INVENTION

1. Field of the Invention

The present invention relates to multilayer ceramic electronic components and methods for producing multilayer ceramic electronic components.

2. Description of the Related Art

As a multilayer ceramic electronic component that is obtained by firing a multilayer body including a plurality of insulator layers, containing ceramic, and a plurality of inner electrode layers, a multilayer ceramic capacitor is known. In response to a great demand for miniaturization and larger capacitance, green sheets and inner electrode layers in multilayer ceramic capacitors have been made thinner and multi-layered.

Thinning of an inner electrode layer sometimes causes separation of the inner electrode layer. Japanese Unexamined Patent Application Publication No. 2010-59467 describes nickel powder that can prevent electrode separation of an inner electrode layer.

Japanese Unexamined Patent Application Publication No. 2010-59467 discloses that it is preferable to use nickel powder containing chromium and magnesium as well as nickel so as to prevent electrode separation of an inner electrode layer.

In a process of producing a multilayer ceramic capacitor, a multilayer body is formed by laminating a plurality of green sheets, which are to be an inner electrode layer and are coated with conductor paste, and the multilayer body is fired at a firing temperature of ceramic that makes up the green sheets.

During firing, a sintering temperature of nickel contained in the conductor paste is lower than the firing temperature in the firing process and therefore, the nickel tends to be over-sintered and becomes spherical in the firing process. When nickel becomes spherical, electrode separation easily occurs. A probability in an occurrence of electrode separation is particularly increased when nickel particles having a small particle size are used.

On the other hand, when nickel particles having a large particle size are used, the occurrence of electrode separation caused by over-sintering can be prevented to some extent. However, there is a problem in that the thickness of an inner electrode layer cannot be lowered in the use of nickel particles having the large particle size, and the demand for thinning the inner electrode layer cannot be met.

Even in the use of the nickel powder described in Japanese Unexamined Patent Application Publication No. 2010-59467, it has been difficult to sufficiently prevent the occurrence of electrode separation caused by over-sintering and spheronization due to the above-described reasons and to meet the demand for thinning inner electrode layers.

SUMMARY OF THE INVENTION

Example embodiments of the present invention provide multilayer ceramic electronic components in each of which an occurrence of electrode separation is prevented and an inner electrode layer is able to be thinned, and methods for producing such multilayer ceramic electronic components.

The inventor of example embodiments the present invention investigated how to prevent an occurrence of electrode separation and a reduction in thickness of inner electrode layers and discovered that it is effective to shape metal particles of the inner electrode layers in a flat shape, thus obtaining the present invention.

That is, a multilayer ceramic electronic component according to an example embodiment of the present invention includes a multilayer body including a plurality of insulator layers including ceramic, and a plurality of inner electrode layers, and an aspect ratio of a metal particle of the inner electrode layers is about 1.8 or greater.

Metal particles of inner electrode layers of a multilayer ceramic electronic component according to an example embodiment the present invention are flat particles whose shapes are thin in a thickness direction of a multilayer body and extend in a length direction and a width direction of the multilayer body. An aspect ratio is used as an indicator of whether or not a metal particle has a flat shape.

An aspect ratio is calculated as a ratio (width direction of a multilayer body/thickness direction of the multilayer body) of a shape of a metal particle, and the higher this value is, the flatter the particle is. A larger aspect ratio corresponds to a smaller dimension of a metal particle in the thickness direction, and this is preferable from a viewpoint of reducing the thickness of an inner electrode layer. Further, a larger aspect ratio means that a metal particle extends in the width direction without being cut, and this is preferable from a viewpoint of preventing an occurrence of electrode separation.

In a multilayer ceramic electronic component according to an example embodiment of the present invention, a thickness T (μm) of the inner electrode layers and a volume V ($mm^3$) of a multilayer body preferably satisfy an expression (1):

$$T \leq 0.0552 \times \ln V + 0.5239 \quad (1).$$

When this expression is satisfied, it means that a multilayer ceramic electronic component, in which the thickness of inner electrode layers is small relative to the volume of a multilayer body, has been obtained.

A method for producing a multilayer ceramic electronic component according to an example embodiment of the present invention includes forming a laminated block by laminating a plurality of ceramic green sheets, on which an inner electrode pattern for forming an inner electrode layer is formed, obtaining a plurality of chips by cutting the laminated block, passing the chips through a furnace whose internal temperature is set at about 1200° C. to about 1600° C. for a time of about 30 seconds or less, and performing main firing of the chips, which have undergone the heat treatment process, by increasing the temperature from about 900° C. to a maximum temperature at a temperature increase rate of about 5° C./min or more.

In the above-described processes, by performing the heat treatment process and the main firing process, an occurrence of electrode separation is prevented in the main firing process, to obtain a multilayer ceramic electronic component in which inner electrode layers are thinned and electrode separation is prevented.

According to example embodiments of multilayer ceramic electronic components and methods for producing such multilayer ceramic electronic components, an occurrence of electrode separation is prevented and inner electrode layers are able to be thinned.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components and methods for producing multilayer ceramic electronic components according to example embodiments of the present invention will be described below with reference to the accompanying drawings. However, the present invention is not limited to the following configurations and can be appropriately modified and applied in a scope not changing the gist of the present invention. A combination of two or more of the individual preferred configurations of the present invention described below is also within the scope of the present invention.

Multilayer ceramic electronic components and methods for producing multilayer ceramic electronic components according to example embodiments of the present invention will be described below by taking multilayer ceramic capacitors as an example of the multilayer ceramic electronic components.

Figure 1:
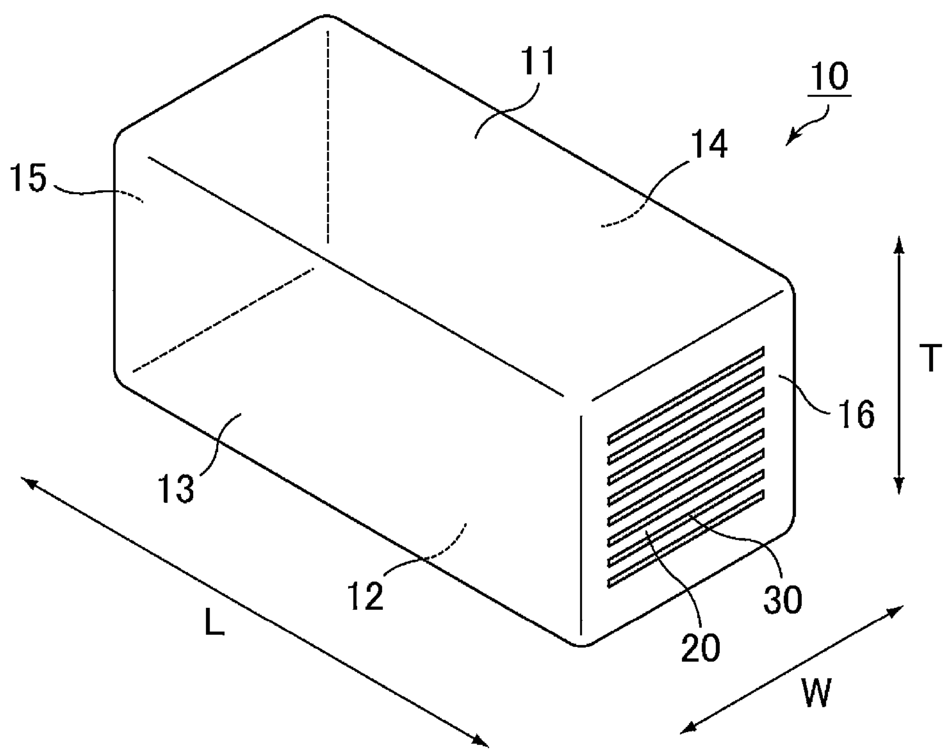
FIG. 1 is a perspective view schematically illustrating an example of a multilayer body of a multilayer ceramic capacitor which is an example of a multilayer ceramic electronic component according to an example embodiment of the present invention.
Figure 2:
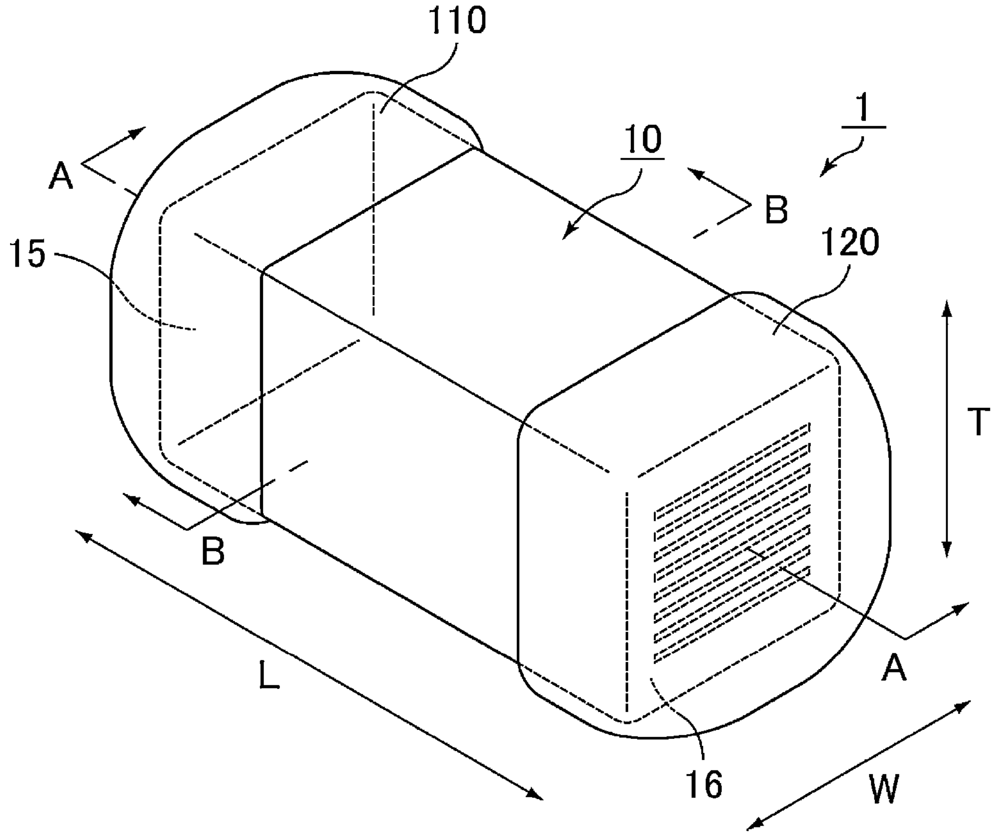
FIG. 2 is a perspective view schematically illustrating an example of a multilayer ceramic capacitor which is an example of a multilayer ceramic electronic component according to an example embodiment of the present invention.

A multilayer ceramic capacitor according to an example embodiment of the present invention includes a multilayer body and a plurality of outer electrodes that are provided on a portion of a surface of the multilayer body. FIG. 1 is a perspective view schematically illustrating an example of a multilayer body of a multilayer ceramic capacitor which is an example of a multilayer ceramic electronic component according to an example embodiment of the present invention. FIG. 2 is a perspective view schematically illustrating an example of the multilayer ceramic capacitor. A multilayer ceramic capacitor 1 illustrated in FIG. 2 includes an outer electrode 110 and an outer electrode 120 on a portion of the surface of a multilayer body 10 illustrated in FIG. 1.

In the multilayer ceramic capacitor and the multilayer body, a length direction, a width direction, and a lamination direction are directions defined by double arrows L, W, and T respectively in the multilayer body 10 illustrated in FIG. 1 and in the multilayer ceramic capacitor 1 illustrated in FIG. 2. Here, the length direction, the width direction, and the lamination direction are orthogonal or substantially orthogonal to each other. The lamination direction is a direction in which a plurality of dielectric layers 20 and a plurality of inner electrode layers 30 of the multilayer body 10 are stacked.

The multilayer body 10 has a rectangular or substantially rectangular parallelepiped shape including six surfaces which are a first main surface 11 and a second main surface 12, which are opposed to each other in the lamination direction, a first side surface 13 and a second side surface 14, which are opposed to each other in the width direction, and a first end surface 15 and a second end surface 16, which are opposed to each other in the length direction. The substantially rectangular parallelepiped shape of the multilayer body includes a rectangular parallelepiped shape with rounded corners and ridges, and also includes a shape with uneven surfaces.

The multilayer ceramic capacitor 1 illustrated in FIG. 2 includes the outer electrode 110 on the first end surface 15 of the multilayer body 10 and the outer electrode 120 on the second end surface 16 of the multilayer body 10. The portions on which respective outer electrodes are provided are portions where the inner electrode layers are exposed from the end surfaces of the multilayer body.

The dielectric layer is an insulator layer including, for example, ceramic. A dielectric material of the dielectric layer can be, for example, dielectric ceramic including barium titanate, calcium titanate, strontium titanate, barium calcium titanate, or calcium zirconate as a main component. Further, subcomponents such as, for example, Mg compounds, Mn compounds, Si compounds, μl compounds, V compounds, and Ni compounds, which are less than the main components, may be added to these main components.

An average thickness of the dielectric layer sandwiched by the inner electrode layers is preferably about 0.2 μm or greater and about 2 μm or less, for example.

The dielectric layer includes outer layer portions and an inner layer portion. The outer layer portion is a dielectric layer that is positioned closer to each main surface of the multilayer body and is positioned between the main surface and an inner electrode which is the closest to the main surface. A region sandwiched between both outer layer portions is the inner layer portion. The thickness of one outer layer portion is preferably about 5 μm or greater and about 200 μm or less, for example.

The outer electrode, which is provided on the first end surface of the multilayer body, further may extend from the first end surface to the first side surface, the second side surface, the first main surface, and the second main surface. The outer electrode, which is provided on the second end surface of the multilayer body, also further may extend from the second end surface to the first side surface, the second side surface, the first main surface, and the second main surface.

The outer electrode preferably includes, for example, an underlying electrode layer and a plating layer arranged on the underlying electrode layer. The underlying electrode layer preferably includes at least one layer of a baked electrode layer, a resin electrode layer, a thin film layer, and the like, for example.

The baked electrode layer includes glass and metal. As the glass, for example, $BaO—SrO—B_2O_3—SiO_2$ glass frit or the like can be used. The metal preferably includes at least one metal selected from, for example, Cu, Ni, Ag, Pd, Ag—Pd alloy, Au, and the like. Further, a plurality of baked electrode layers may be provided.

The thickness (the thickest portion) of the baked electrode layer is preferably, for example, about 5 μm or greater and about 150 μm or less.

The resin electrode layer may include, for example, conductive particles and thermosetting resin. The resin electrode layer may be directly provided on the multilayer body without the baked electrode layer. Further, a plurality of resin electrode layers may be provided.

The thin film layer is a layer having the thickness of, for example, about 1 μm or less, which is formed by a thin film formation method such as, for example, a sputtering method and a vapor deposition method and on which metal particles are deposited.

The plating layer is preferably a layer including at least one metal selected from, for example, of Cu, Ni, Ag, Pd, Ag—Pd alloy, Au, Sn, and the like.

The plating layer may include a plurality of layers. A two-layer structure with, for example, Ni plating layer and Sn plating layer is preferably provided. The Ni plating layer can reduce or prevent erosion of the underlying electrode layer caused by solder used when mounting the multilayer ceramic capacitor. The Sn plating layer improves solder wettability in mounting the multilayer ceramic capacitor, to facilitate the mounting.

The average thickness of the Ni plating layer is preferably, for example, about 1 μm or greater and about 15 μm or less. The average thickness of the Sn plating layer is preferably, for example, about 1 μm or greater and about 15 μm or less.

The plurality of inner electrode layers include a first inner electrode layer and a second inner electrode layer.

The inner electrode layer includes metal particles, for example, of metal such as Ni, Cu, Ag, Pd, and Au or an alloy such as Ag—Pd alloy, Ni—Sn alloy, and Ni alloy. The inner electrode layer may further include dielectric particles having the same composition as the dielectric ceramic included in the dielectric layer. The number of laminated layers of the inner electrode layers is preferably, for example, three or greater and 2000 or less.

In the multilayer ceramic electronic component according to the present example embodiment, an aspect ratio of metal particles of the inner electrode layer is, for example, about 1.8 or greater. A method for measuring an aspect ratio of a metal particle and a definition thereof will be described.

An aspect ratio of a metal particle is obtained based on the following expression (2).

$$\text{ASPECT RATIO OF METAL PARTICLE} = \frac{\begin{array}{c}\text{CROSS-SECTIONAL AREA OF METAL PARTICLE OBTAINED}\\ \text{WHEN 50\% OF TOTAL CROSS-SECTIONAL AREA IS REACHED}\\ \text{BY ACCUMULATING CROSS-SECTIONAL AREAS FROM SMALLEST}\end{array}}{\begin{array}{c}\text{AVERAGE VALUE OF THICKNESS OF INNER ELECTRODE LAYERS} \times\\ \text{AVERAGE VALUE OF THICKNESS OF INNER ELECTRODE LAYERS}\end{array}} \tag{2}$$

In order to obtain an aspect ratio of a metal particle based on the above expression, "a cross-sectional area of a metal particle obtained when 50% of a total cross-sectional area is reached by accumulating cross-sectional areas from the smallest" and "an average value of thickness of inner electrode layers" need to be measured based on a WT cross section of the multilayer ceramic capacitor. Measuring methods for these will be described below.

The WT cross section of the multilayer ceramic capacitor corresponds to a sectional view taken along a B-B line of the multilayer ceramic capacitor 1 illustrated in FIG. 2 and is a cross section that cuts the first side surface, the second side surface, the first main surface, and the second main surface of the multilayer ceramic capacitor.

Figure 3A:
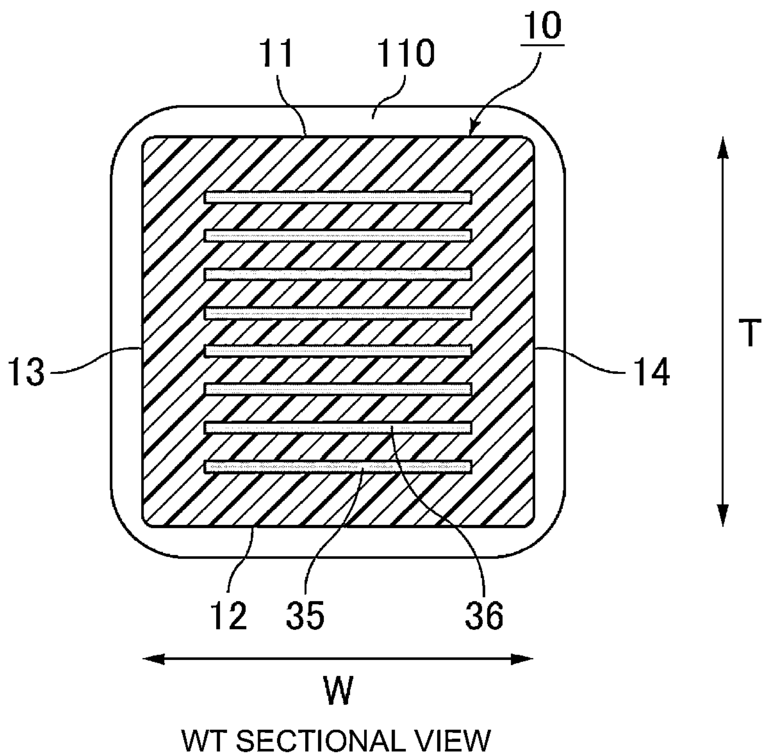
FIG. 3A is a sectional view schematically illustrating an example of a WT cross section of the multilayer ceramic capacitor in FIG. 2.
Figure 3B:
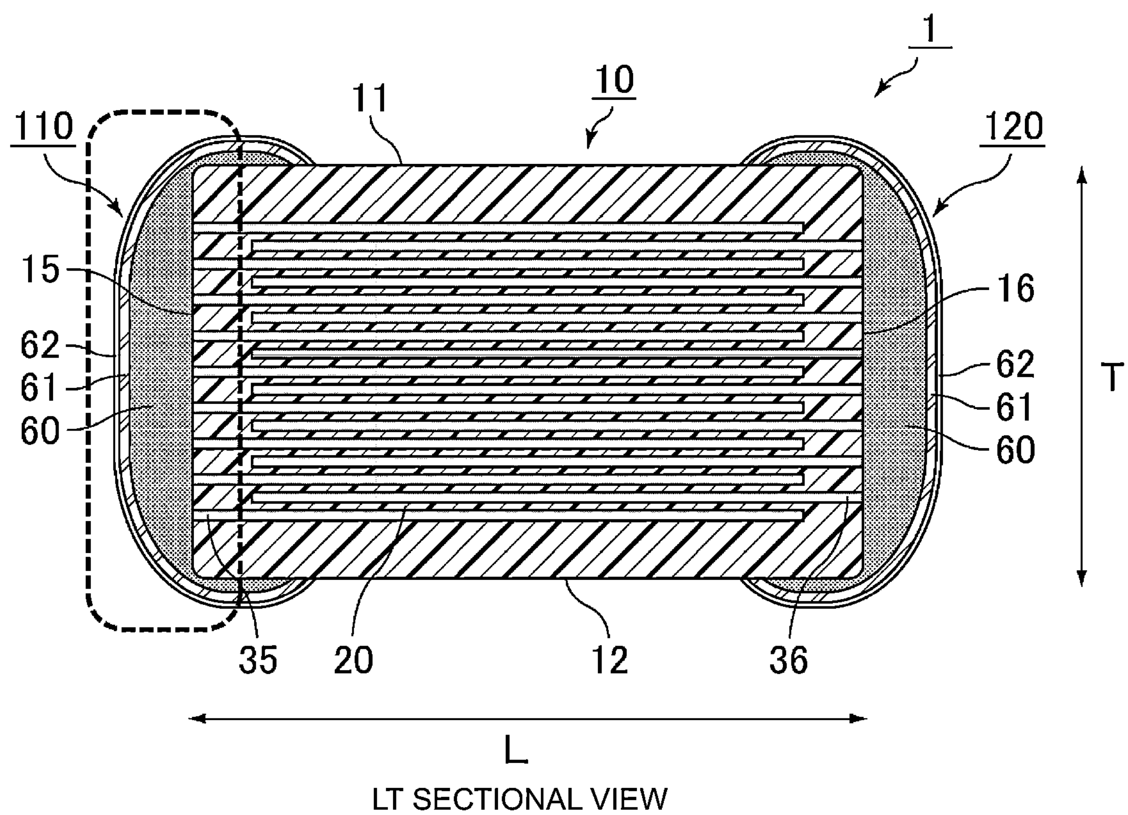
FIG. 3B is a sectional view schematically illustrating an example of a LT cross section of the multilayer ceramic capacitor in FIG. 2.

FIG. 3A is a sectional view schematically illustrating an example of the WT cross section of the multilayer ceramic capacitor. FIG. 3B is a sectional view schematically illustrating an example of a LT cross section of the multilayer ceramic capacitor. The LT cross section of the multilayer ceramic capacitor illustrated in FIG. 3B corresponds to a sectional view taken along an A-A line of the multilayer ceramic capacitor 1 illustrated in FIG. 2 and is a cross section that cuts the first end surface, the second end surface, the first main surface, and the second main surface of the multilayer ceramic capacitor.

FIG. 3A illustrates a first inner electrode layer 35 and a second inner electrode layer 36 as inner electrode layers.

FIG. 3B illustrates the first inner electrode layer 35 and the second inner electrode layer 36 as inner electrode layers. The first inner electrode layer 35 includes a first counter electrode portion, which is opposed to the second inner electrode layer 36, and a first extended electrode portion, which is extended from the first counter electrode portion to the first end surface 15 of the multilayer body 10 and is connected with the outer electrode 110.

The second inner electrode layer 36 includes a second counter electrode portion, which is opposed to the first inner electrode layer 35, and a second extended electrode portion, which is extended from the second counter electrode portion to the second end surface 16 of the multilayer body 10 and is connected with the outer electrode 120.

FIG. 3B also illustrates a baked electrode layer 60, a Ni plating layer 61, and an Sn plating layer 62 as components of the outer electrode 110 and the outer electrode 120.

"A cross-sectional area of a metal particle obtained when 50% of a total cross-sectional area is reached by accumulating cross-sectional areas from the smallest" which is necessary for measuring an aspect ratio of a metal particle is measured as follows.

The multilayer body or the multilayer ceramic capacitor is first polished so that the WT cross section thereof is exposed, exposing the inner electrode layers as those illustrated in FIG. 3A.

Further, focused ion beam processing (FIB processing) is performed with respect to the surface, on which the inner electrode layers are exposed, of the WT cross section by an angle of about 45°. Then, the FIB processed surface is observed with a scanning ion microscope (SIM) by an angle of about 90°. Single crystal regions of metal particles can be visualized by the SIM observation.

Figure 4:
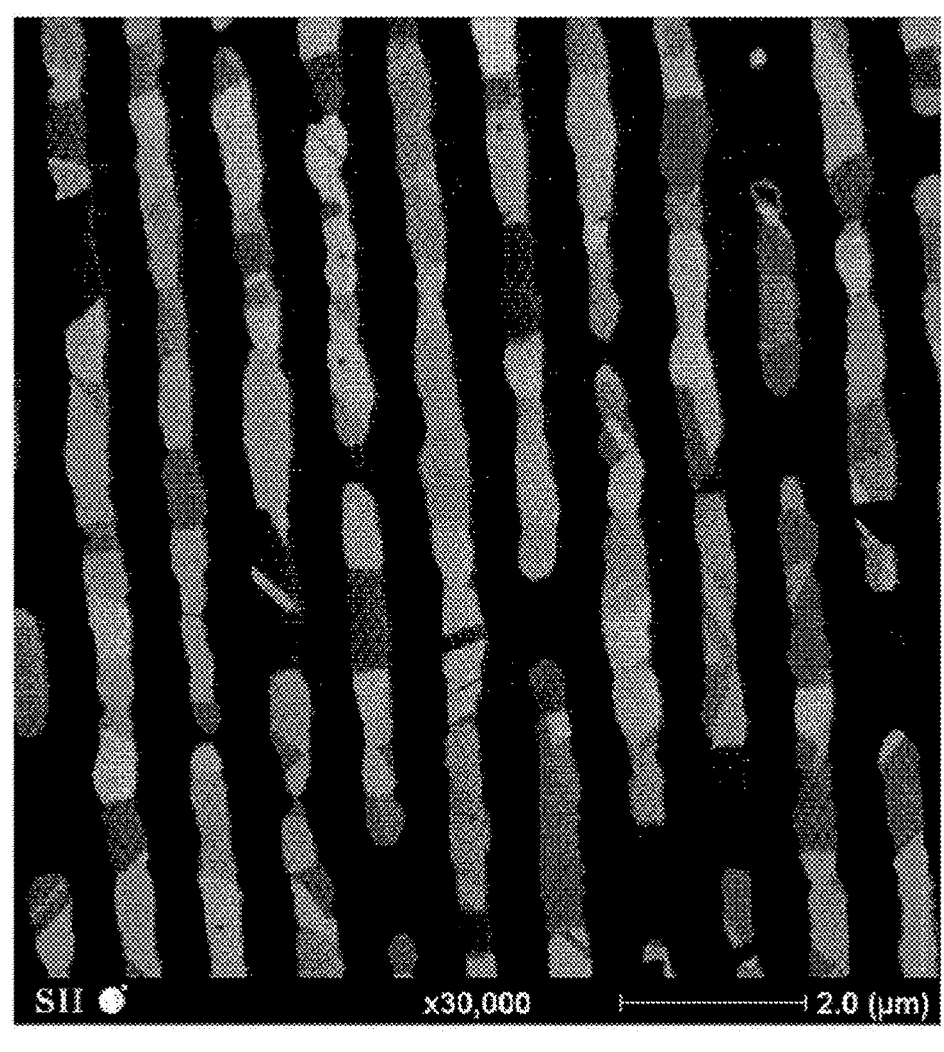
FIG. 4 is a SIM observation image with respect to an FIB processed surface of a multilayer ceramic capacitor according to an example embodiment of the present invention.

FIG. 4 is a SIM observation image with respect to the FIB processed surface of the multilayer ceramic capacitor. This image is also a SIM observation image with respect to an FIB processed surface of the multilayer ceramic capacitor manufactured in Example 1 described later. In this image, uniform-black (gray) part shows dielectric layers and band part of a color from light gray to black shows inner electrode layers. In the SIM observation image, the color of each metal particle that constitutes the inner electrode layer appears different due to the fact that the metal particle is polycrystalline and crystal orientations are different.

Figure 5:
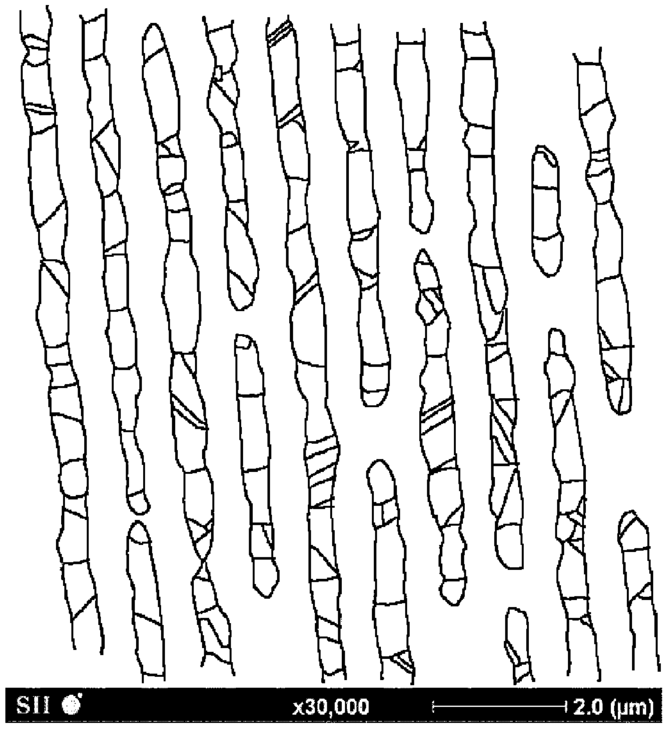
FIG. 5 is an image obtained by image processing with respect to the SIM observation image.

Image processing is performed on the SIM observation image thus obtained, and lines are drawn on boundaries of the metal particles. FIG. 5 is an image obtained by image processing with respect to the SIM observation image. The image processing for drawing lines on the boundaries of the metal particles can be performed manually by an observer.

Each region indicated by a line in this image is a cross-sectional area of each metal particle. Therefore, an area of each region is measured. The area measurement can be performed by using image processing software (such as, for example, WinROOF manufactured by Mitani Corporation).

Figure 6:
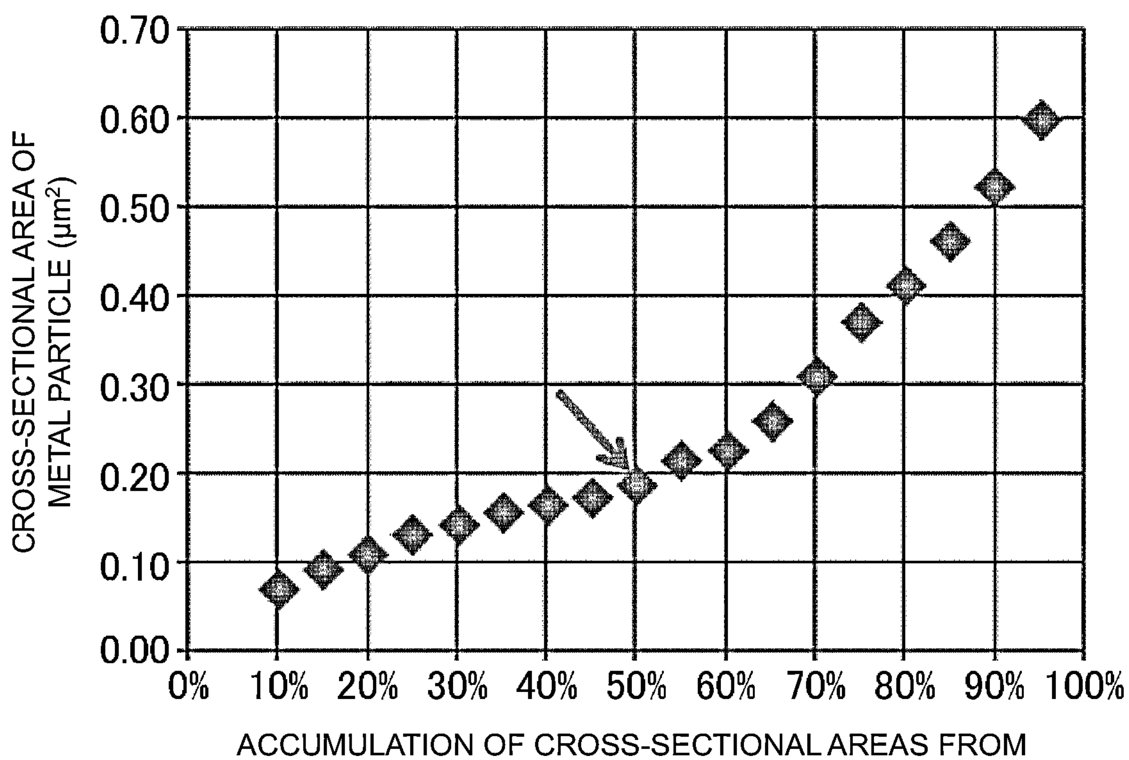
FIG. 6 is a graph schematically illustrating a method for obtaining a cross-sectional area of a metal particle when about 50% of a total cross-sectional area is reached by accumulating cross-sectional areas of metal particles.

Then, a cross-sectional area of a metal particle obtained when about 50% of a total cross-sectional area is reached by accumulating cross-sectional areas from the smallest is determined. FIG. 6 is a graph schematically illustrating a method for obtaining a cross-sectional area of a metal particle when about 50% of a total cross-sectional area is reached by accumulating cross-sectional areas of metal particles. A point indicated by an arrow in FIG. 6 is the point where about 50% of a total cross-sectional area is reached by accumulating cross-sectional areas of metal particles. The cross-sectional area of the metal particle on the point is approximately 0.19 $\mu m^2$, for example.

Next, "an average value of thickness of inner electrode layers" which is necessary to measure an aspect ratio of a metal particle is measured as follows.

The multilayer body or the multilayer ceramic capacitor is first embedded in polishing resin and is polished (rough grinding with abrasive grains of approximately #1000 and mirror finishing with fine colloidal silica are preferable) so that the WT cross section thereof is exposed, thus exposing inner electrode layers as those illustrated in FIG. 3A.

Figure 7:
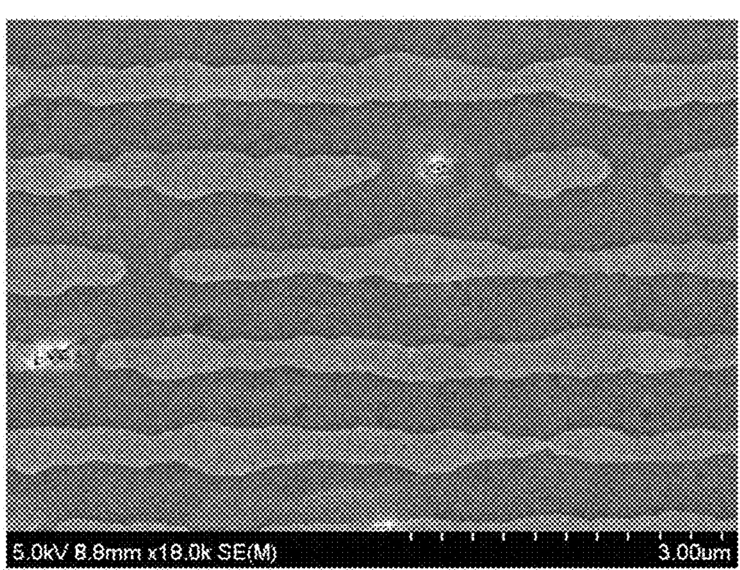
FIG. 7 is a SEM observation image of a multilayer ceramic capacitor according to an example embodiment of the present invention.

The inner electrode layers are observed with a scanning electron microscope (SEM). FIG. 7 is a SEM observation image of the multilayer ceramic capacitor. In this image, a dark gray portion shows dielectric layers and a light gray band portion shows inner electrode layers.

Figure 8:
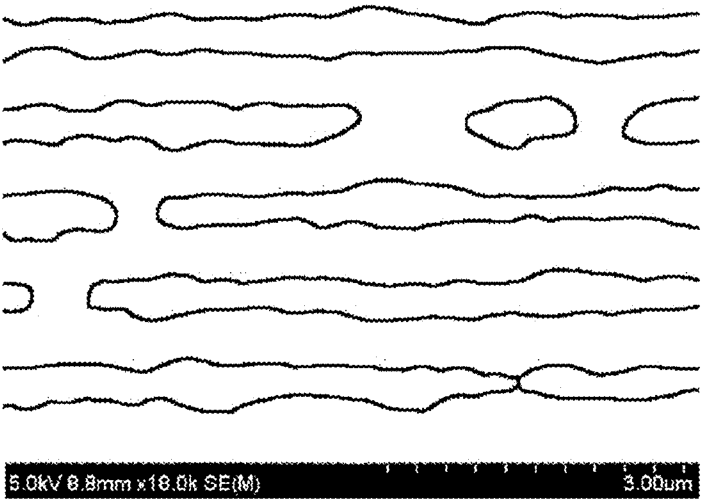
FIG. 8 is an image obtained by image processing with respect to the SEM observation image.

Image processing is performed on the SEM observation image thus obtained, and lines are drawn on boundaries of inner electrode layers. FIG. 8 is an image obtained by image processing with respect to the SEM observation image. The image processing for drawing lines on the boundaries of the inner electrode layers can be performed manually by an observer.

An average value of thickness of regions delimited by the lines in this image can be determined as "an average value of thickness of inner electrode layers". The measurement of a thickness average value can be performed by using image processing software (such as, for example, WinROOF manufactured by Mitani Corporation).

Then, the "average value (μm) of thickness of inner electrode layers" and the "cross-sectional area ($\mu m^2$) of a metal particle obtained when 50% of a total cross-sectional area is reached by accumulating cross-sectional areas from the smallest" are substituted into the above expression (2), being able to obtain an aspect ratio of a metal particle.

This value corresponds to "area/thickness×thickness" of the metal particle and can be read as "area/thickness× thickness" (length×thickness/thickness×thickness)=length/thickness, representing a ratio between the length and thickness of the metal particle.

The aspect ratio of the metal particle is, for example, about 1.8 or greater, which means that the metal particle is thin in thickness and long in length, that is, the metal particle has a flat shape. Aspect ratios of metal particles are preferably, for example, about 1.9 or greater, and more preferably about 2.3 or greater. Further, aspect ratios of metal particles are preferably, for example, about 30 or less.

An aspect ratio of a metal particle is measured from a WT cross section of a multilayer ceramic electronic component. Therefore, an aspect ratio can also be said to be a ratio of the length of a metal particle in a W direction/the length in a T direction.

Here, an aspect ratio when measuring an aspect ratio of a metal particle at the LT cross section in the same manner can be also said as a ratio of the length of the metal particle in an L direction/the length in the T direction. This aspect ratio is also preferably, for example, about 1.8 or greater.

When both of the aspect ratio measured at the LT cross section and the aspect ratio measured at the WT cross section are, for example, about 1.8 or greater, the metal particle can be said to have a three-dimensionally flat (also flat plate) shape.

In the multilayer ceramic electronic components according to example embodiments of the present invention, electrode separation can be prevented from occurring and inner electrode layers can be thinned by setting an aspect ratio of metal particles of the inner electrode layers to, for example, about 1.8 or greater. The thickness of an inner electrode layer is preferably, for example from about 0.15 μm to about 0.80 μm inclusive, and more preferably from about 0.20 μm to about 0.50 μm inclusive.

There is an indicator called coverage indicating the degree of occurrence of electrode separation in a multilayer ceramic electronic component. Coverage is an indicator that indicates a ratio of an area where inner electrode layers are actually present of an area where the inner electrode layers are to be formed, and the higher this indicator is, the less electrode separation occurs. Therefore, higher coverage is preferable.

In multilayer ceramic electronic components according to example embodiments of the present invention, coverage is preferably, for example, about 80% or higher, more preferably about 84% or higher, and furthermore preferably about 88% or higher.

Coverage can be obtained by the following expression (3) based on the length of a portion where an inner electrode layer is continued in a direction parallel to the W direction and the length of a portion where the inner electrode layer is cut in the SEM observation image used in the measurement of the "average value (μm) of thickness of inner electrode layers" described above.

$$\text{COVERAGE (\%)} = \frac{\text{LENGTH OF PORTION WHERE INNER ELECTRODE LAYER IS CONTINUED}}{\text{ENTIRE LENGTH OF INNER ELECTRODE LAYER}} \times 100 \tag{3}$$

In multilayer bodies of multilayer ceramic electronic components according to example embodiments of the present invention, the thickness of the inner electrode layer can be lowered while maintaining high coverage. Specifically, the thickness of the inner electrode layer can be set to, for example, about 0.80 μm or less while maintaining coverage at about 80% or higher. Therefore, the entire or substantially the entire thickness of the multilayer body can be reduced while setting the coverage to, for example, about 80% or higher.

A preferable thickness of the inner electrode layer varies depending on the number of laminated green sheets (inner electrode layers) in the multilayer body. However, the thickness is preferably, for example, about 0.35 μm or less when the number of laminated sheets is 270, and the thickness is preferably, for example, about 0.47 μm or less when the number of laminated sheets is 540.

Further, the multilayer body includes side portions (W gap), which are positioned between the first and second counter electrode portions and the respective side surfaces, and end portions (L gap), which are positioned between the first and second counter electrode portions and the respective end surfaces and include extended electrode portions of the first and second inner electrodes.

The average length of the L gap in the L direction is preferably, for example, about 20 μm or greater and about 120 μm or less. The average length of the W gap in the W direction is preferably, for example, about 5 μm or greater and about 100 μm or less.

In the multilayer ceramic electronic component, thickness T (μm) of the inner electrode layers and a volume V ($mm^3$) of the multilayer body preferably satisfy a following expression (1):

$$T \leq 0.0552 \times \ln V + 0.5239 \tag{1}.$$

When this expression is satisfied, it means that a multilayer ceramic electronic component, in which the thickness of inner electrode layers is small relative to the volume of a multilayer body, has been able to be obtained.

Further, the thickness T of the inner electrode layer and the volume V of the multilayer body preferably satisfy the following expression (4) and more preferably satisfy the following expression (5).

$$0.0552 \times \ln V + 0.3336 \leq T \tag{4}$$

$$0.0552 \times \ln V + 0.3856 \leq T \tag{5}$$

The multilayer ceramic capacitor 1 illustrated in FIG. 2 is a two-terminal capacitor in which the outer electrodes are provided on both respective end surfaces of the multilayer body. However, the multilayer ceramic capacitor 1 is not limited to the two-terminal capacitor as long as the multilayer ceramic capacitor 1 includes a multilayer body including a plurality of dielectric layers and a plurality of inner electrode layers. The multilayer ceramic capacitor 1 may be, for example, a three-terminal capacitor in which outer electrodes are provided on end surfaces and a side surface of a multilayer body, or a capacitor in which an outer electrode is provided only on a side surface of a multilayer body.

A non-limiting example of a method for producing a multilayer ceramic electronic component according to an example embodiment of the present invention will now be described. A method for producing a multilayer ceramic capacitor as a multilayer ceramic electronic component will be described as the example.

A ceramic green sheet is obtained by applying a ceramic slurry, which is a mixture of ceramic, an organic material, a solvent, and the like and will be a dielectric layer, onto a carrier film such as, for example, PET film in sheet form by a method such as, for example, spray coating, die coating, screen printing, or the like.

Then, conductive paste for forming inner electrode layers is prepared, which is made of metal particles such as, for example, Ni powder, a solvent, a dispersant, a binder, and the like. The conductive paste for forming inner electrode layers is applied on the ceramic green sheet by a method such as, for example, screen printing and gravure printing so as to form an inner electrode pattern.

The green sheet on which the inner electrode pattern is formed is thus prepared.

A plurality of ceramic green sheets on which an inner electrode pattern is formed are laminated so as to obtain a laminated sheet. The laminated sheet is shaped by applying pressure using, for example, rigid press, isostatic press, or the like, obtaining a laminated block (laminating process). The laminated block is divided by, for example, push-cutting or cutting with a dicing machine, obtaining a plurality of chips (cutting process).

A degreasing process is performed on the chips. In the degreasing process, processing is performed at a maximum temperature of about 300° C., for example. Tar is removed through the degreasing process. The degreasing process is preferably performed in, for example, a nitrogen atmosphere.

Subsequently, a heat treatment process is performed on the chips that have undergone the degreasing process. In the heat treatment process, processing is performed by allowing the chips to pass through a furnace whose internal temperature is set at, for example, about 1200° C. to about 1600° C. for a time of about 30 seconds or shorter.

Further, a firing process (main firing process) is performed after cooling. In the firing process, the chips that have undergone the heat treatment process are subjected to main firing by increasing the temperature from, for example, about 900° C. to a maximum temperature at a temperature increase rate of about 5° C./min or more, preferably about 10° C./min or more. The temperature increase rate is preferably, for example, about 50° C./min or more. Each of the inner electrodes or the dielectric layers are thus fired. The residence time is preferably, for example, about 30 seconds or less, but may be 30 minutes. The maximum temperature is preferably, for example, from about 1150° C. to about 1300° C. inclusive. The holding time at the maximum temperature is preferably from, for example, about 50 seconds to about 200 seconds inclusive.

Further, the firing is preferably performed in a reducing atmosphere consisting of, for example, about $H_2$—$N_2$—$H_2O$ gas.

According to the above-described method, an inner electrode layer including metal particles whose aspect ratio is about 1.8 or greater is formed and a multilayer body is obtained.

Subsequently, conductive paste, which is to be an outer electrode, is applied to the multilayer body by, for example, dipping method. By firing the multilayer body to which the conductive paste is applied, the conductive paste becomes a baked electrode layer that is a portion of the outer electrode. A plating layer is formed on the baked electrode layer by plating processing. A multilayer ceramic capacitor can be produced through these processes.

EXAMPLES

Examples more specifically disclosing the multilayer ceramic electronic component according to example embodiments of the present invention will be described below. However, the present invention is not limited to only these examples.

Manufacturing of Multilayer Ceramic Capacitor

Example 1

Polyvinyl butyral binder, plasticizer, and ethanol as an organic solvent were added to $BaTiO_3$ as a ceramic raw material, and these were wet mixed by a ball mill to prepare a ceramic slurry. Subsequently, the ceramic slurry was shaped into a sheet by a lip method, obtaining a rectangular or substantially rectangular ceramic green sheet. Then, conductive paste including Ni was applied to the ceramic green sheet by screen printing so as to form an inner electrode pattern including mainly of Ni. The coating thickness of the conductive paste was set to, for example, about 0.20 μm. The thickness of the ceramic green sheet was set so that the thickness of a dielectric layer of a finished product was, for example, about 0.59 μm.

A mother block was obtained in a manner such that a plurality of ceramic green sheets, on which an inner electrode pattern was formed, were laminated while being shifted in the width direction and a ceramic green sheet, on which an inner electrode pattern was not printed, was laminated on each of the top and the bottom of the laminated ceramic green sheets. The obtained mother block was pressed in the lamination direction by isostatic press. The number of laminated layers was, for example, 270.

The pressed mother block was cut into chip shapes so as to obtain green chips each of which includes inner electrodes that were exposed on both end surfaces and both side surfaces.

A green sheet for ceramic protection layer was bonded on one cut side surface of the green chip so as to form a raw ceramic protection layer. The composition of the green sheet for ceramic protection layer is the same as the composition of the ceramic green sheet.

A raw ceramic protection layer was also formed on the other cut side surface of the green chip in the same or substantially the same manner as the above description. Accordingly, a raw component main body was obtained.

After the main firing process, an outer electrode was formed by applying and firing conductive paste, thus manufacturing the multilayer ceramic capacitor of Example 1. The obtained multilayer ceramic capacitor had the 0603 size (about 0.6 mm×about 0.3 mm).

Examples 2 to 8

Multilayer ceramic capacitors were manufactured in the same or substantially the same manner as Example 1 except that each condition was changed from that of Example 1 as shown in Tables 1 and 2.

Comparative Example 1

The main firing process was performed in the same or substantially the same manner as Example 1 by changing the coating thickness of conductive paste to about 0.30 μm and changing the heat treatment process to the degreasing process of about 800° C. so as to manufacture a multilayer ceramic capacitor.

Comparative Example 2

A multilayer ceramic capacitor was manufactured in the same or substantially the same manner as Example 1 except that the heat treatment process was not performed.

Coverage of multilayer bodies, thickness of inner electrode layers, and aspect ratios of metal particles were calculated by the methods described in this specification. Further, dimensions of the multilayer bodies and volumes of the multilayer bodies were measured. These results are collectively shown in Tables 1 and 2 below.

TABLE 1

| | MANUFACTURING CONDITION | | | |
|---|---|---|---|---|
| | SIZE | NUMBER OF LAMINATED LAYERS (SHEETS) | THICKNESS OF DIELECTRIC LAYER OF FINISHED PRODUCT (μm) | COATING THICKNESS OF CONDUCTIVE PASTE (μm) |
| EXAMPLE 1 | 0603 | 270 | 0.59 | 0.20 |
| EXAMPLE 2 | 0603 | 270 | 0.59 | 0.20 |
| EXAMPLE 3 | 0603 | 270 | 0.59 | 0.20 |
| EXAMPLE 4 | 0603 | 20 | 0.32 | 0.15 |
| EXAMPLE 5 | 0603 | 20 | 0.32 | 0.12 |
| EXAMPLE 6 | 0603 | 50 | 0.48 | 0.20 |
| EXAMPLE 7 | 0603 | 50 | 0.48 | 0.20 |
| EXAMPLE 8 | 0603 | 50 | 0.48 | 0.20 |
| COMPARATIVE EXAMPLE 1 | 0603 | 270 | 0.59 | 0.30 |
| COMPARATIVE EXAMPLE 2 | 0603 | 270 | 0.59 | 0.20 |

TABLE 2

| | EVALUATION OF MULTILAYER BODY | | | | | | |
|---|---|---|---|---|---|---|---|
| | | THICKNESS OF INNER | ASPECT RATIO | DIMENSION OF MULTILAYER BODY | | | VOLUME OF MULTILAYER BODY |
| | COVERAGE (%) | ELECTRODE LAYER (μm) | OF METAL PARTICLE | L (mm) | W (mm) | T (mm) | V (mm3) |
| EXAMPLE 1 | 89 | 0.327 | 2.3 | 0.54 | 0.28 | 0.28 | 0.043 |
| EXAMPLE 2 | 89 | 0.310 | 1.9 | 0.54 | 0.28 | 0.28 | 0.042 |

TABLE 2-continued

| | EVALUATION OF MULTILAYER BODY | | | | | | |
|---|---|---|---|---|---|---|---|
| | COVERAGE (%) | THICKNESS OF INNER ELECTRODE LAYER (μm) | ASPECT RATIO OF METAL PARTICLE | DIMENSION OF MULTILAYER BODY L (mm) | W (mm) | T (mm) | VOLUME OF MULTILAYER BODY V (mm3) |
| EXAMPLE 3 | 80 | 0.349 | 1.8 | 0.54 | 0.28 | 0.28 | 0.043 |
| EXAMPLE 4 | 92 | 0.242 | 5.1 | 0.58 | 0.30 | 0.21 | 0.037 |
| EXAMPLE 5 | 88 | 0.202 | 7.4 | 0.59 | 0.29 | 0.21 | 0.036 |
| EXAMPLE 6 | 87 | 0.345 | 2.1 | 0.54 | 0.28 | 0.28 | 0.042 |
| EXAMPLE 7 | 86 | 0.352 | 2.3 | 0.54 | 0.28 | 0.28 | 0.042 |
| EXAMPLE 8 | 79 | 0.382 | 1.8 | 0.53 | 0.28 | 0.28 | 0.042 |
| COMPARATIVE EXAMPLE 1 | 85 | 0.497 | 1.7 | 0.62 | 0.35 | 0.35 | 0.076 |
| COMPARATIVE EXAMPLE 2 | 70 | 0.452 | 1.6 | 0.54 | 0.28 | 0.28 | 0.043 |

As can be seen from the Tables 1 and 2, the coverage is high as about 79% or higher and the thickness of the inner electrode layer and the thickness of the multilayer body are able to be thinned in the multilayer ceramic capacitor of each example in which the aspect ratio of the metal particle is about 1.8 or greater.

The aspect ratio of the metal particle is about 1.7 in Comparative example 1. Although the coverage is able to be raised to about 85% by increasing the coating thickness of the conductive paste, the thickness of the inner electrode layer and the thickness of the multilayer body are increased.

In Comparative example 2, the aspect ratio of the metal particle is about 1.6, and the coverage is low as about 70% and the thickness of the inner electrode layer is large.

Example 9

In Example 9, a multilayer ceramic capacitor having the 1005 size (about 1.0 mm×about 0.5 mm) was manufactured. Although the producing process was substantially the same as that of Example 1, some conditions were changed as the coating thickness of conductive paste was set to about 0.25 μm and the number of laminated layers was set to 540.

Example 10

A multilayer ceramic capacitor was manufactured in the same or substantially the same manner as Example 9.

Comparative Example 3

The main firing process was performed in the same or substantially the same manner as Example 9 by changing the coating thickness of conductive paste to about 0.32 μm, changing the number of laminated layers to 492, and changing the heat treatment process to the degreasing process of about 850° C. Thus, a multilayer ceramic capacitor was manufactured.

Comparative Example 4

The main firing process was performed in the same or substantially the same manner as Example 9 by changing the heat treatment process to the degreasing process of about 850° C. so as to manufacture a multilayer ceramic capacitor.

Coverage of multilayer bodies, thickness of inner electrode layers, and aspect ratios of metal particles were calculated by the methods described in this specification. Further, dimensions of the multilayer bodies and volumes of the multilayer bodies were measured. These results are collectively shown in Tables 3 and 4 below.

TABLE 3

| | MANUFACTURING CONDITION | | | |
|---|---|---|---|---|
| | SIZE | NUMBER OF LAMINATED LAYERS (SHEETS) | THICKNESS OF DIELECTRIC LAYER OF FINISHED PRODUCT (μm) | COATING THICKNESS OF CONDUCTIVE PASTE (μm) |
| EXAMPLE 9 | 1005 | 540 | 0.59 | 0.25 |
| EXAMPLE 10 | 1005 | 540 | 0.59 | 0.25 |
| COMPARATIVE EXAMPLE 3 | 1005 | 492 | 0.59 | 0.32 |
| COMPARATIVE EXAMPLE 4 | 1005 | 540 | 0.59 | 0.25 |

TABLE 4

| | EVALUATION OF MULTILAYER BODY | | | | | | |
|---|---|---|---|---|---|---|---|
| | COVERAGE (%) | THICKNESS OF INNER ELECTRODE LAYER (μm) | ASPECT RATIO OF METAL PARTICLE | DIMENSION OF MULTILAYER BODY L (mm) | W (mm) | T (mm) | VOLUME OF MULTILAYER BODY V (mm3) |
| EXAMPLE 9 | 85 | 0.457 | 3.4 | 1.03 | 0.59 | 0.62 | 0.376 |
| EXAMPLE 10 | 80 | 0.470 | 1.9 | 1.03 | 0.58 | 0.63 | 0.376 |
| COMPARATIVE EXAMPLE 3 | 83 | 0.547 | 1.6 | 1.05 | 0.59 | 0.62 | 0.388 |

TABLE 4-continued

| | EVALUATION OF MULTILAYER BODY | | | | | | |
|---|---|---|---|---|---|---|---|
| | | THICKNESS OF INNER | ASPECT RATIO | DIMENSION OF MULTILAYER BODY | | | VOLUME OF MULTILAYER BODY |
| | COVERAGE (%) | ELECTRODE LAYER (μm) | OF METAL PARTICLE | L (mm) | W (mm) | T (mm) | V (mm3) |
| COMPARATIVE EXAMPLE 4 | 71 | 0.530 | 1.6 | 1.03 | 0.58 | 0.63 | 0.376 |

As can be seen from these Tables 3 and 4, the coverage is high as about 80% or higher and the thickness of the inner electrode layer and the thickness of the multilayer body are able to be thinned in the multilayer ceramic capacitor of each of Examples 9 and 10 in which the aspect ratio of the metal particle is about 1.8 or greater.

The aspect ratio of the metal particle is about 1.6 in Comparative example 3. Although the coverage is able to be raised to about 80% or greater by increasing the coating thickness of the conductive paste, the thickness of the inner electrode layer is increased. The thickness of the multilayer body is similar to those of Examples 9 and 10 because the number of laminated layers is reduced so as to obtain the multilayer ceramic capacitor of the 1005 size. It is considered that the electrostatic capacity is lowered because the number of laminated layers is lower.

In the Comparative example 4, the aspect ratio of the metal particle is about 1.6, and the coverage is low as about 71% and the thickness of the inner electrode layer is large.

Figure 9:
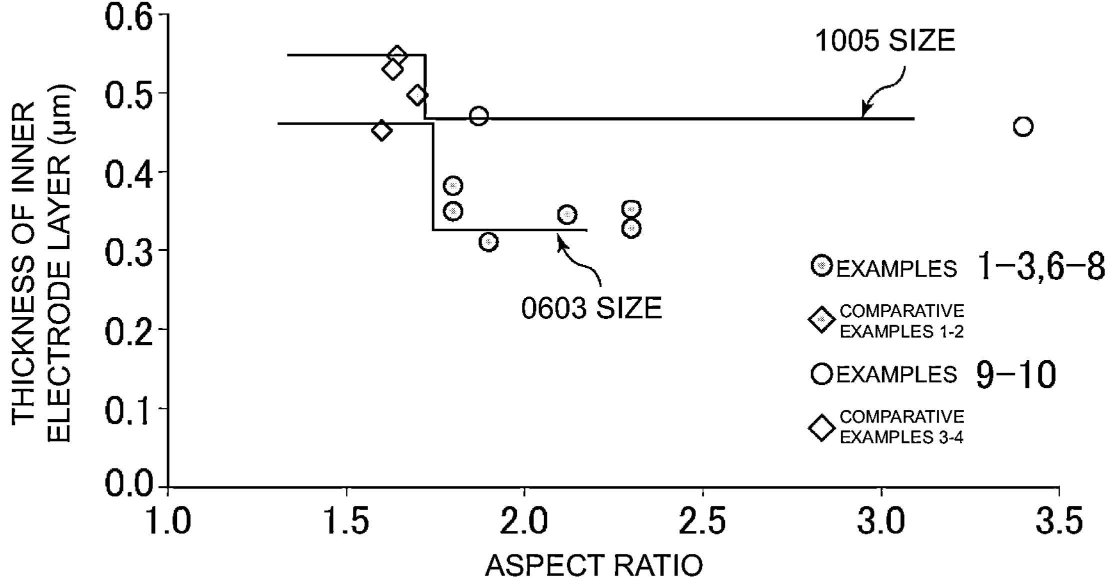
FIG. 9 is a diagram illustrating a relationship between an aspect ratio of a metal particle and a thickness of an inner electrode layer in multilayer ceramic capacitors produced in examples and comparative examples.

FIG. 9 is a diagram illustrating a relationship between an aspect ratio of a metal particle and thickness of an inner electrode layer in multilayer ceramic capacitors produced in examples and comparative examples. Examples 4 and 5, which have large aspect ratios of metal particles, are excluded from FIG. 9.

Comparing the multilayer ceramic capacitors having the same or substantially the same size in FIG. 9, it can be seen that the thickness of the inner electrode layer is thinner when the aspect ratio of the metal particle is about 1.8 or greater.

Figure 10:
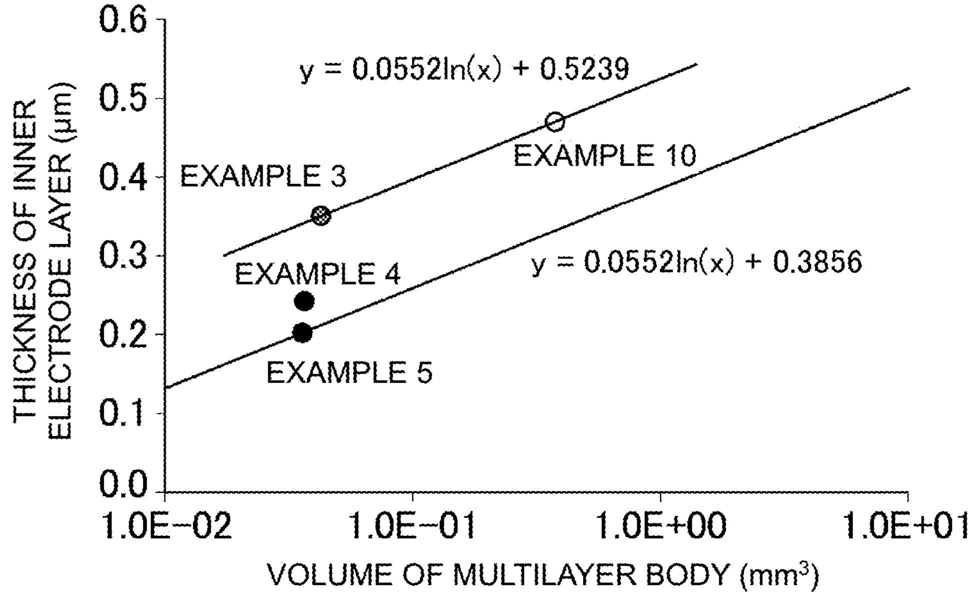
FIG. 10 is a diagram illustrating a relation between a volume of a multilayer body and thickness of an inner electrode layer in multilayer ceramic capacitors produced in Examples 3 to 5 and 10.

FIG. 10 is a diagram illustrating a relationship between a volume of a multilayer body and thickness of an inner electrode layer in multilayer ceramic capacitors produced in Examples 3 to 5 and 10.

From Examples 3 and 10, an expression for preferred ranges for the volume V ($mm^3$) of the multilayer body and the thickness T (μm) of the inner electrode layer is derived. This expression is the following relational expression (1) described in the specification.

$$T \leq 0.0552 \times \ln V + 0.5239 \quad (1)$$

This expression (1) indicates the upper limit of the preferred range for the thickness T of the inner electrode layer relative to the volume V of the multilayer body.

On the other hand, drawing a line through the plot of Example 5 with the same or substantially the same inclination as the expression (1), the following relational expression (5) is obtained.

$$0.0552 \times \ln V + 0.3856 \leq T \quad (5)$$

This expression (5) indicates the lower limit of the preferred range for the thickness T of the inner electrode layer relative to the volume V of the multilayer body.

Plots corresponding to respective examples are positioned in a region sandwiched by the lines of the expression (1) and the expression (5).

Figure 11:
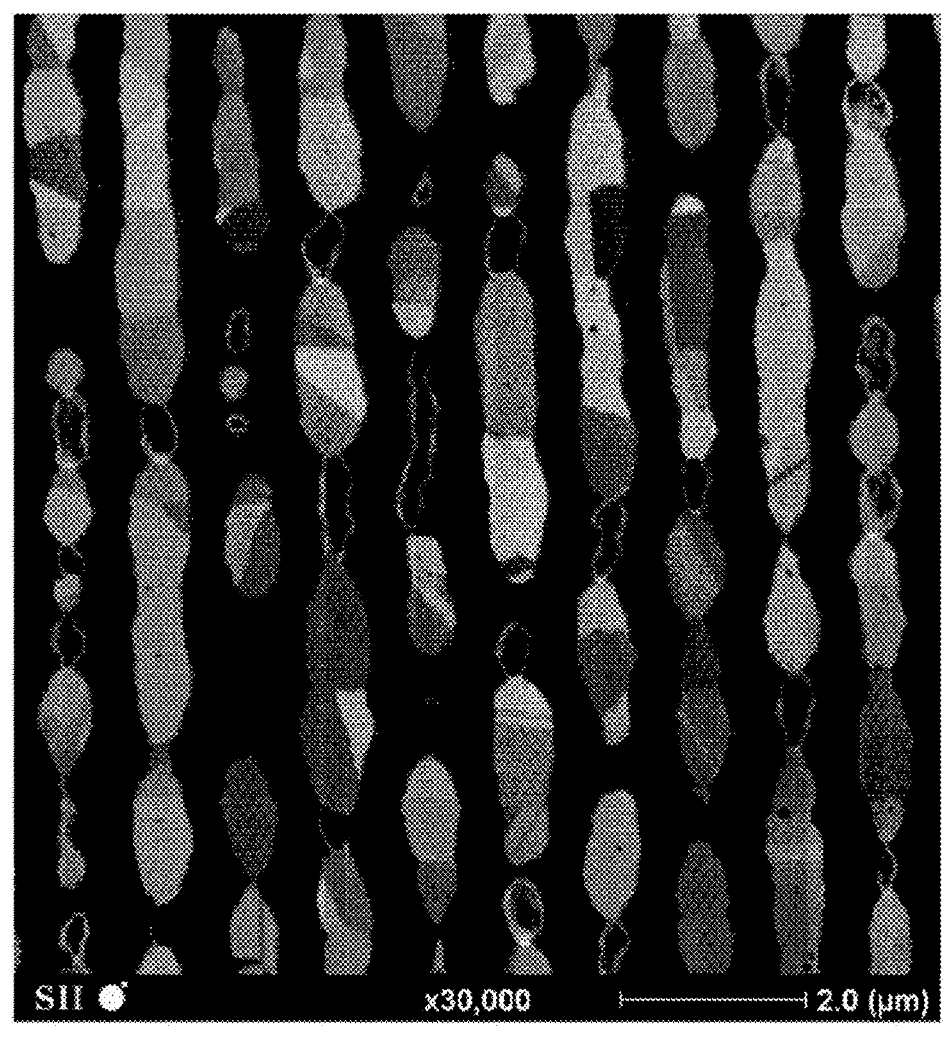
FIG. 11 is a SIM observation image with respect to an FIB processed surface of a multilayer ceramic capacitor produced in Comparative example 2.

FIG. 11 is a SIM observation image with respect to an FIB processed surface of a multilayer ceramic capacitor produced in Comparative example 2.

On the other hand, FIG. 4 shown above is the SIM observation image with respect to the FIB processed surface of the multilayer ceramic capacitor manufactured in Example 1.

Comparing these two images, it can be seen that the thickness of the inner electrode layers is smaller in the multilayer ceramic capacitor manufactured in Example 1. The small thickness of the inner electrode layers is related to a large aspect ratio of metal particles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:

a multilayer body including a plurality of insulator layers including ceramic, and a plurality of inner electrode layers; wherein an aspect ratio of a metal particle in the inner electrode layers is about 1.8 or greater and less than 2.09.

2. The multilayer ceramic electronic component according to claim 1, wherein a thickness T (μm) of the plurality of inner electrode layers and a volume V ($mm^3$) of the multilayer body satisfy a following relational expression (1):

$$T \leq 0.0552 \times \ln V + 0.5239 \quad (1).$$

3. The multilayer ceramic electronic component according to claim 1, wherein the multilayer ceramic electronic component is a multilayer ceramic capacitor.

4. The multilayer ceramic electronic component according to claim 1, further comprising a plurality of outer electrodes on an outer surface of the multilayer body.

5. The multilayer ceramic electronic component according to claim 4, wherein each of the plurality of outer electrodes includes an underlying electrode layer and a plating layer on the underlying electrode layer.

6. The multilayer ceramic electronic component according to claim 5, wherein the underlying electrode layer is a baked electrode layer including a glass and a metal.

7. The multilayer ceramic electronic component according to claim 6, wherein the glass includes a BaO—SrO—$B_2O_3$—$SiO_2$ glass frit.

8. The multilayer ceramic electronic component according to claim 6, wherein the a thickness of the baked electrode layer is about 5 μm or greater and about 150 μm or less.

9. The multilayer ceramic electronic component according to claim 5, wherein the underlying electrode layer is a resin electrode layer including conductive particles and a thermosetting resin.

10. The multilayer ceramic electronic component according to claim 5, wherein the underlying electrode layer is a thin film layer having a thickness of about 1 μm or less.

11. The multilayer ceramic electronic component according to claim 5, wherein the plating layer includes at least one of Cu, Ni, Ag, Pd, Ag—Pd alloy, Au, or Sn.

12. The multilayer ceramic electronic component according to claim 5, wherein the plating layer includes a Ni plating layer and an Sn plating layer.

13. The multilayer ceramic electronic component according to claim 12, wherein the Ni plating layer has an average thickness of about 1 μm or greater and about 15 μm or less.

14. The multilayer ceramic electronic component according to claim 12, wherein the Sn plating layer has an average thickness of about 1 μm or greater and about 15 μm or less.

15. The multilayer ceramic electronic component according to claim 1, wherein the multilayer body has a rectangular or substantially rectangular parallelepiped shape.

16. The multilayer ceramic electronic component according to claim 15, wherein the multilayer body includes rounded corners and ridges.

17. The multilayer ceramic electronic component according to claim 1, wherein each of the plurality of insulator layers includes barium titanate, calcium titanate, strontium titanate, barium calcium titanate, or calcium zirconate as a main component.

18. The multilayer ceramic electronic component according to claim 17, wherein each of the plurality of insulator layers includes Mg compounds, Mn compounds, Si compounds, Al compounds, V compounds, or Ni compounds as a subcomponent.

19. The multilayer ceramic electronic component according to claim 1, wherein an average thickness of each of the plurality of insulator layers is about 0.2 μm or greater and about 2 μm or less.

20. A method for producing the multilayer ceramic electronic component according to claim 1, comprising:

sintering the plurality of insulator layers including the ceramic, and the plurality of inner electrode layers.

* * * * *